(12) United States Patent
Rodgers et al.

(10) Patent No.: US 8,039,810 B2
(45) Date of Patent: Oct. 18, 2011

(54) SCINTILLATION-BASED CONTINUOUS MONITOR FOR BETA-EMITTING RADIONUCLIDES IN A LIQUID MEDIUM

(75) Inventors: John C. Rodgers, Santa Fe, NM (US); Markku J. Koskelo, Albuquerque, NM (US)

(73) Assignee: Canberra Industries, Inc., Meriden, CT (US)

( * ) Notice: Subject to any disclaimer, the term of this patent is extended or adjusted under 35 U.S.C. 154(b) by 228 days.

(21) Appl. No.: 12/408,512

(22) Filed: Mar. 20, 2009

(65) Prior Publication Data
US 2009/0261261 A1 Oct. 22, 2009

Related U.S. Application Data

(60) Provisional application No. 61/047,020, filed on Apr. 22, 2008.

(51) Int. Cl.
  *G01T 1/20* (2006.01)
  *G21F 3/00* (2006.01)
  *G01V 5/00* (2006.01)
(52) U.S. Cl. ............... 250/370.11; 250/515.1; 250/255
(58) Field of Classification Search ............. 250/370.11, 250/515.1, 432 R, 269.3, 255, 256, 364
See application file for complete search history.

(56) References Cited

U.S. PATENT DOCUMENTS

| | | | | |
|---|---|---|---|---|
| 3,657,541 A | * | 4/1972 | Deutsch et al. ............ | 250/252.1 |
| 4,578,588 A | * | 3/1986 | Galkin ...................... | 250/432 R |
| 5,229,604 A | * | 7/1993 | Larson et al. ............... | 250/255 |
| 6,815,665 B2 | * | 11/2004 | Storm et al. ................ | 250/269.3 |
| 7,727,772 B2 | * | 6/2010 | Hollebone et al. ......... | 436/165 |
| 2008/0260100 A1 | * | 10/2008 | Tarancon Sanz et al. ...... | 378/66 |

FOREIGN PATENT DOCUMENTS

| | | |
|---|---|---|
| EP | 1860464 A1 | 11/2007 |
| JP | 61160079 A | 7/1986 |
| WO | 9953340 A1 | 10/1999 |
| WO | 2007093913 A2 | 8/2007 |

OTHER PUBLICATIONS

Beals, et al.; "In-Situ SAmple Preparation for Radiochemical Analyses of Surface Water"; Savannah River Technology Center, Environmental Protection Department, Westinghouse Savannah River Co., Aiken, SC 29808; (Feb. 2000); 27 pp.
Smith, et al.; "Radiochemical Analysis Using Empore™ Rad Disks"; Global '99, International Conference on Future Nuclear Systems, Jackson Hole, WY; Aug. 29-Sep. 3, 1999; (8 pp.).

* cited by examiner

*Primary Examiner* — David Porta
*Assistant Examiner* — Faye Boosalis
(74) *Attorney, Agent, or Firm* — David W. Carstens; Steven H. Washam; Carstens & Cahoon, LLP (57) ABSTRACT

A scintillation-based detection device and method for continuous monitoring of flowing liquids for the presence of radionuclides. A side-stream pipe directs a portion of the monitored liquid from the main flow transfer pipe through and/or around the detector. Within the side-stream pipe is a scintillation detector assembly, having either a nested-cylindrical or stacked-element shape. The real-time to near real-time detection capabilities are influenced by the total surface area of the detector assembly. The detectors are operated in anti-coincidence mode to distinguish pure beta-emitters from beta-gamma emitters and from pure gamma events. A gross beta count, gross gamma count, or some combination may also be determined.

17 Claims, 3 Drawing Sheets

SCINTILLATION-BASED CONTINUOUS MONITOR FOR BETA-EMITTING RADIONUCLIDES IN A LIQUID MEDIUM

CROSS-REFERENCE TO RELATED APPLICATIONS

This application claims the benefit of provisional Application No. 61/047,020, filed Apr. 22, 2008.

STATEMENT REGARDING FEDERALLY SPONSORED RESEARCH OR DEVELOPMENT

Not Applicable

THE NAMES OF THE PARTIES OF A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to radiation detection and, more specifically, to the detection of beta emitting radionuclides in a flowing fluid medium.

2. Description of Related Art Including Information Disclosed Under 37 CFR 1.97 and 1.98

Radionuclides in water and liquid food products are a serious public health threat that the Food and Drug Administration (FDA) in conjunction with the Environmental Protection Agency (EPA) seeks to control through stringent regulations. The EPA currently mandates specific limits for radionuclides in drinking water: radium 226/228 (5 pCi/L); alpha emitters (15 pCi/L) (not including radon and uranium); beta emitters (4 mrem/year); and uranium (30 µg/L). Radionuclide in other liquid foodstuffs, such as milk, are likewise regulated.

Radionuclides in milk are a concern primarily because of the quantity of milk consumed by children. Children have a higher cellular activity than adults and are more susceptible to the damaging effects of ionizing radiation. Strontium-90 (Sr-90) is of particular concern because of its chemical similarities to calcium. These similarities cause compounds of Sr-90, when ingested, to be deposited in biological systems, exposing them to radiation damage. Although the US Environmental improvement Agency has found that present levels of Sr-90 in milk attributable to atmospheric testing of nuclear weapons are barely detectable, concern still exists for possible contamination from other sources, including malicious attempts at food adulteration. For that reason, the food and Drug Administration has established a program of food surveillance. Having a means for efficiently monitoring of the milk supply for such radionuclides is, therefore, of vital importance.

Present detection techniques for monitoring for radionuclides in liquid foodstuff, such as milk, require collection and processing of grab samples. For example, a technician may perform periodic testing of a municipal water supply by drawing a representative water sample and sending it to a lab for off-line analysis. In the lab, the sample is tested by performing a solid-phase extraction technique to isolate specific radionuclides, or one of many other possible concentration and radiochemical analysis techniques. In the case of solid-phase extraction, the analyte is isolated by pulling a sample through a special resin coated filter membrane and subsequently assaying the membrane using a common counting technique.

Solid-phase extraction and other radiochemical techniques for isolating radionuclides require substantial time to complete. In the time it takes to sample and test an analyte, significant amounts of contaminated liquid may have already entered the food supply. Halting the movement of product while awaiting test results would prevent this, but would be impractical since such action would have a severe negative impact on manufacturing efficiency and productivity.

In addition to Sr-90, milk contains significant amounts of the naturally occurring radioactive isotope Potassium-40 (K-40). K-40 is relatively benign when consumed because it has a long half-life ($1.250 \times 10^9$ years) and is maintained in equilibrium at very low concentrations in the body through homeostatic processes. Sr-90 is hazardous because it and its radioactive decay product, Yttrium (Y-90), deposit in critical organs such as the bones. Within the bones, their respective beta emissions irradiate large volumes of tissue. Further, both Sr-90 and Y-90 build up within the body (long biological half-life), displacing beneficial calcium.

K-40 decays to produce both a very strong beta (0.455 MeV) and gamma (1.46 MeV) emission. Sr-90 decay produces a single, strong beta (0.196 MeV) emission as well, along with its daughter radionuclide, Y-90 beta (0.935 MeV) emission. Consequently, it is exceedingly difficult to differentiate K-40 and Sr/Y-90 when only carrying out gross-beta count analysis. Since both radionuclides would potentially be present in milk, it is important that analysis techniques be able to differentiate between the two beta-emitters in order to quantify the presence of Sr-90. Current techniques for differentiating the two beta emitters merely further increase the time required for analysis of a sample.

Accordingly, a need exists for an online means for testing liquid foodstuff or water for radionuclides that allows for near real-time detection with minimal impact on processing of the product. Further, a need exists for an online means for testing liquid foodstuff that can differentiate between Sr-90 and K-40 without the need for off-line analysis. The present invention satisfies this need and others as described below.

BRIEF SUMMARY OF THE INVENTION

The present invention utilizes a side-stream tube with a deflection element to divert a sufficient portion of main flow of a liquid foodstuff for analysis. The side-stream tube comprises a dual detector assembly for online assaying to detect energetic beta and/or gamma emissions from the sampled flow. The detector assembly is immersed in the stream of liquid being monitored. If beta-gamma emitters are present in the fluid above a detection threshold value, a notification is provided.

The detector assembly features two long cylindrical plastic scintillators. The primary detector features a hollow inner core within which the secondary detector resides. The scintillation light pulses from each scintillator are routed to a dedicated photodetector assembly. A thin layer of aluminum or aluminized polyester film separates the two detectors and prevents light pulses in one detector from being registered by the other detector. Another thin layer of aluminum or aluminized polyester film encapsulates the primary detector to protect it from the flowing fluid being monitored. Dense shielding (such as lead, steel, or tungsten) may also be placed around the side-stream tube in order to block environmental (i.e., background) sources from affecting the detectors. In yet another embodiment the detector is a combination of flat plates that are sandwiched together (i.e., the cylinder is "unrolled").

In one embodiment, the inner detector is thicker than the outer, making the outer detector more sensitive to beta radiation than gamma. This configuration allows the device to operate in "anti-coincidence mode." In this mode, an event detected by both detectors, but with a larger signal from the inner detector, may be rejected as a gamma event. Likewise, a coincident detection of a gamma and a beta may be rejected as originating from a beta-gamma emitter (such as K-40). An event detected by the outer detector only is considered a pure beta event from a pure beta emitter (such as Sr-90) and is tallied into a gross beta count.

In another embodiment, the detector assembly is a single thin plastic cylindrical scintillator. With sufficient outer shielding, external radiation is maintained at a minimum. Because the scintillator is thin, it is sensitive to beta emissions yet insensitive to gamma emissions. Thus, this configuration allows the detection of beta emissions within the liquid analyte without the use of the anticoincidence mode described above.

In another embodiment the side-stream tube features a positive displacement pump. This pump allows accurate measure of the volume and flow rate of the fluid. By making such observation, a precise measurement of the concentration of radionuclide may be ascertained.

Another embodiment utilizes a specially treated filter membrane in the side-stream flow to detect the presence of radionuclides. A positive displacement pump may be utilized to control the flow of fluid through the membrane. A dual detector assembly in the side-stream counts the membrane's activity.

This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific forces weight, strength, and similar requirements will likewise be within the skill of the art after the following teachings of the present invention have been read and understood.

The invention may be embodied in other specific forms without departing from the spirit or essential characteristics thereof. The present embodiments are therefore to be considered in all respects as illustrative and not restrictive the scope of the invention being indicated by the appended claims rather than by the foregoing description, and all changes which come within the meaning and range of equivalency of the claims are therefore intended to be embraced therein (58,266).

DETAILED DESCRIPTION OF THE INVENTION

Figures 1, 2:
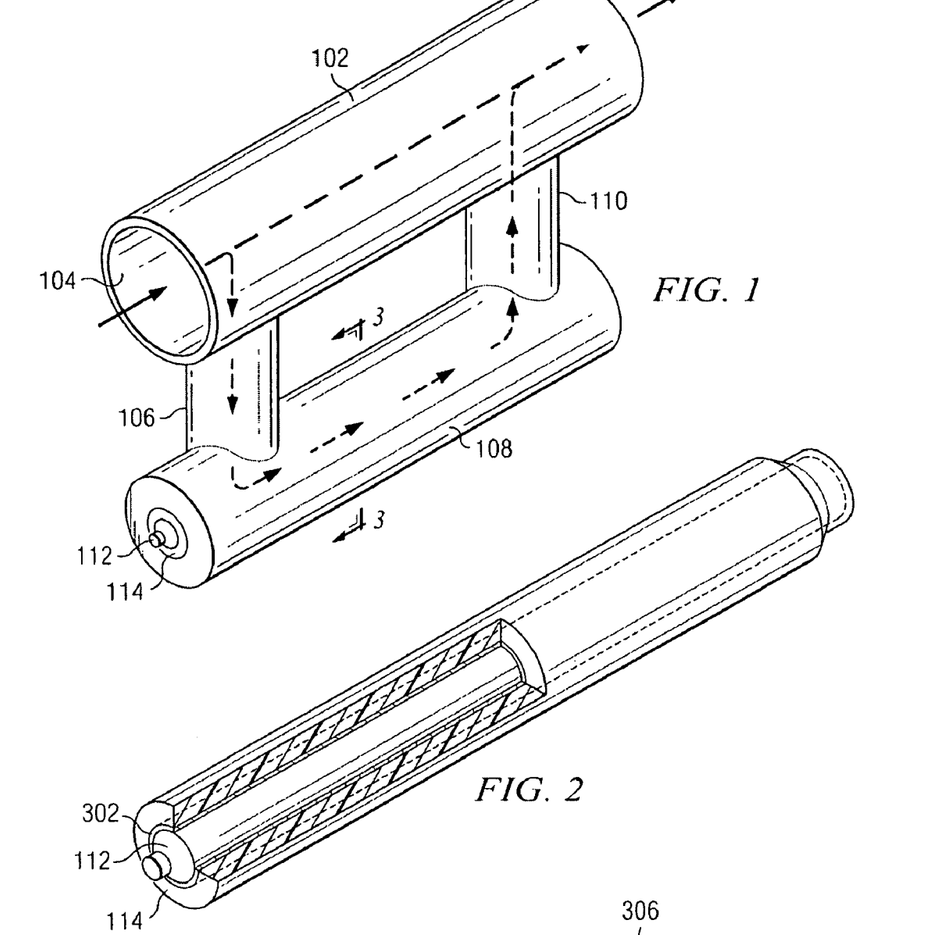
FIG. 1 is an isometric view of an embodiment of the present invention depicting the liquid transfer pipe in conjunction with a side-stream tube in which the radionuclide detectors reside.
FIG. 2 is an isometric view of the dual detector assembly as used in the embodiment.

FIG. 1 depicts an isometric view of the liquid foodstuff transfer pipes in a first embodiment of the present invention. As shown in this image, the liquid of interest (such as drinking water or milk) flows along the interior (104) of the main transfer pipe (102) in the direction shown by the arrows. A side-stream pipe (108) is attached to the main pipe (102) through an intake (106) and an outtake (110). A portion of the fluid transiting the main pipe (102) is directed through the intake (106), along the side pipe (108), through the outtake (110), and back to the main pipe (110). In so doing, disruption of the main pipe (102) fluid flow may be held to a minimum.

The radiation detector assembly comprises an outer (or primary) detector (114) and an inner (or secondary) detector (112). The detector assembly length lies coaxial to the fluid stream within the side-stream pipe (108). This provides the greatest amount of detector surface area for interaction with radionuclides. Connections from the detector assemblies to the detector control circuitry (not shown in the figure) cross the side pipe (108) fluid boundaries such that the photodetection circuitry is outside of the fluid stream. Light pipes may be utilized to transport scintillation light pulses from the detector, across the fluid boundary, and to the respective control circuitry. In another embodiment, the photodetection circuitry is attached directly to a protruding end of the detector.
Detector Details FIG. 2 provides an isometric cutaway view of the detector assembly. The secondary detector (112) is housed within the primary detector (114). Between the primary and secondary detectors is an optical shielding layer (302).

The present embodiment utilizes detectors constructed of plastic scintillation materials. Scintillator plastic may be utilized since it is readily available and relatively inexpensive compared to other scintillation materials. However, other scintillation materials may be used and are within the scope of the present invention. For example, a specialty NaI or LaBr scintillation crystal detector may also be constructed to function as described. The actual material chosen would depend upon decisions such as the desired response characteristics, availability, and cost.

Each detector (primary and secondary) may be comprised of differing scintillating materials depending upon the design requirements. One material may have certain characteristics that are desirable over another. For example, a particular scintillator material may have a desirable wavelength but is hygroscopic. This material may be used as the inner secondary detector because it is encased by the primary detector and thus shielded from any liquid. The primary detector may therefore be constructed from a different scintillator material that is non-hygroscopic and has other desirable characteristics.

Figure 3:
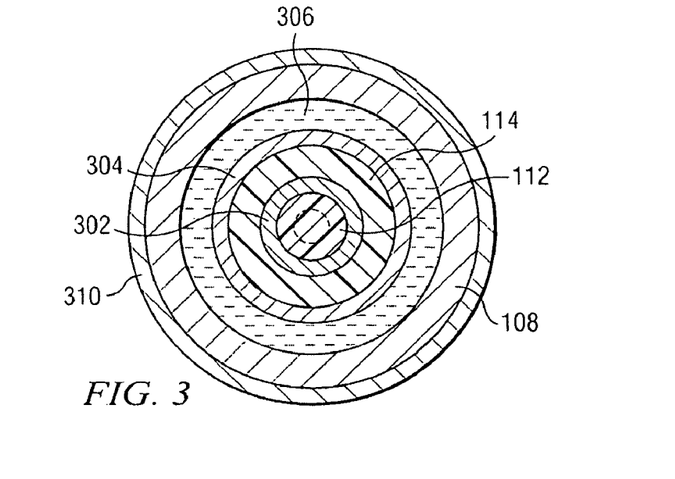
FIG. 3 is a cross section of the dual detector assembly, depicting the various layers of detector material and shielding.

FIG. 3 depicts a cross section of the side-stream pipe (108) and the installed detector assembly (112 and 114). The secondary detector (112) is optically shielded (302) from the primary detector (114) using one or more layers of aluminum or aluminized polyester film (such as aluminized polyester film sold under the trademark MYLAR). This layer of shielding prevents scintillation light pulses in one detector from being registered by the other detector while allowing relatively unrestricted passage of beta and gamma particles. While aluminum or aluminized polyester film is described, other materials may be used so long as the material chosen is opaque to light yet relatively transparent to beta particles.

The primary detector (114) in the present embodiment also utilizes a layer of aluminum or aluminized polyester film (304) to protect it from the flowing liquid (306). This shielding (304) further optically isolates the detector material (114) while allowing relatively free passage of beta and gamma particles. While aluminum or aluminized polyester film is described other materials may be used so long as the material chosen is opaque to light yet transparent to beta particles and gamma radiation.

An outer layer of shielding (310) may be utilized on the exterior of the side-stream pipe (108). Such shielding reduces or eliminates the effects of background radiation on the detector assembly. The present embodiment utilizes lead; however, other dense materials (such as steel or tungsten) may be utilized and are within the scope of the present invention.

In the present embodiment, the primary detector (114) is thin relative to the secondary detector (112). The thinner primary detector (114) material is, therefore, less sensitive to gamma radiation than the thicker secondary detector (112) material. Consequently, because beta particles interact strongly with plastics, the thinner outer detector is more sensitive to beta radiation than to gamma. With this configuration, the two detectors may be operated in anti-coincidence mode.

Gamma and beta particles pass through the detector shielding (302 and 304) with relative ease. Because beta particles interact strongly with plastics, a beta emission from the side-stream fluid will be detected in the primary detector (114) and not in the secondary detector (112). In anti-coincidence mode, an event detected by both detectors (112 and 114) may be rejected as a pure gamma event. Further, an event detected only in the primary detector (114) may be considered a pure beta event and tallied into a gross beta count. Finally, in coincidence mode, a coincident detection of a gamma event (both detectors) and a beta event (primary detector only) may be rejected as having come from a beta-gamma emitter such as K-40. This mode allows the system to differentiate between pure beta emitters (such as Sr-90) and beta-gamma emitters (such as K-40). This operation is especially beneficial when monitoring milk since K-40 occurs naturally in milk and is typically not a health concern. Thus, the present invention may effectively monitor for pure beta emitters and provide notification if a threshold level is reached.

In another embodiment, both coincident and anti-coincident events may be simultaneously monitored. In doing so, it is possible to track gamma and beta events. This operation is beneficial to provide monitoring for the presence of unusually high levels of gamma emitting radionuclides. This embodiment, therefore, provides separate notification of gamma and beta activity in a liquid analyte, while still allowing the embodiment to reject events caused by beta-gamma emitters such as K-40.

Figure 4:
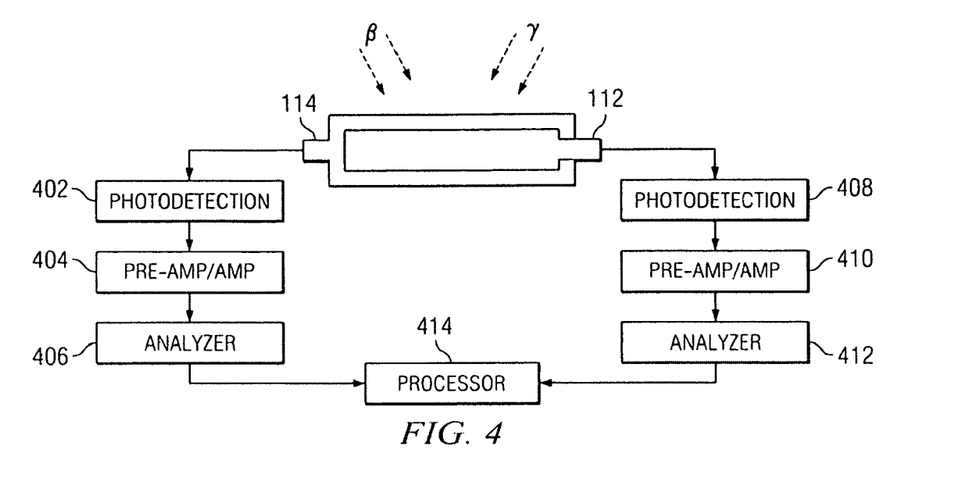
FIG. 4 is a block diagram of the dual detector assembly and corresponding control and detection circuitry.

The configuration to support the anti-coincidence mode requires each detector (primary and secondary) to have its own photodetection circuitry. FIG. 4 depicts such an arrangement. As shown, the primary detector (114) utilizes a photomultiplier tube (402) in addition to amplification (404) and control circuitry (406) such as a single or multi-channel analyzer. The secondary detector (112) utilizes a similar arrangement; photomultiplier tube (408), amplification (410), and control circuitry (412). A central processing device (414) combines the detector outputs and performs the final radionuclide analysis. The processing device may be any general or special purpose computer processing device capable of accepting inputs from the analyzer circuitry and running software code to generate a notification based on the inputs. In the present embodiment, each detector's photodetection circuitry is attached to the respective detector at opposite ends of the side tube (108). However, both photodetection circuits may be attached at the same end if space permits.

In the present embodiment, photomultiplier tubes (PMT) are utilized because they are readily available, cost effective, and efficient in performing photodetection with plastic scintillation materials. However, other photodetection means may be utilized depending on the scintillation material chosen, and are within the scope of the present invention. For example, photodetectors such as silicon drift diodes, photodiodes, or avalanche photodiodes may be utilized. The choice of photodetector is driven primarily by the scintillation material, because each photodetector differs in its photon wavelength sensitivity. Thus, the scintillation material wavelength should ideally be paired with a photodetector having compatible photon wavelength sensitivity.

The length of the scintillation tubes as used in the present invention is dependent upon factors such as fluid flow-rate, detector diameter, and type and emission energy of the radionuclide of interest. Accordingly, the length of the detector material may be established based oil one or more or these criteria. If the fluid is flowing slowly, giving it more time to interact with the detectors, the detectors may be shorter in length. Conversely, if the fluid is flowing quickly or the radionuclide radiation type and energy are relatively weak, a longer length or greater diameter may be required. Thus, the overall surface area exposure of the detector assembly is a dependent factor.

For example, in one embodiment of the present invention configured as a liquid milk monitor, the detector assembly is approximately one meter in length. The thickness of the primary detector is approximately 10-15 mm while the secondary (inner) detector is approximately 50 mm in diameter. The length dimension is limited by how far the light emitted by the scintillator will effectively travel through the plastic. As the milk flows through the side tube along the detector assembly, Sr-90 is detected and counted. If the activity of Sr-90 is above a threshold value, the system provides a notification of the alarm condition.

Figure 5:
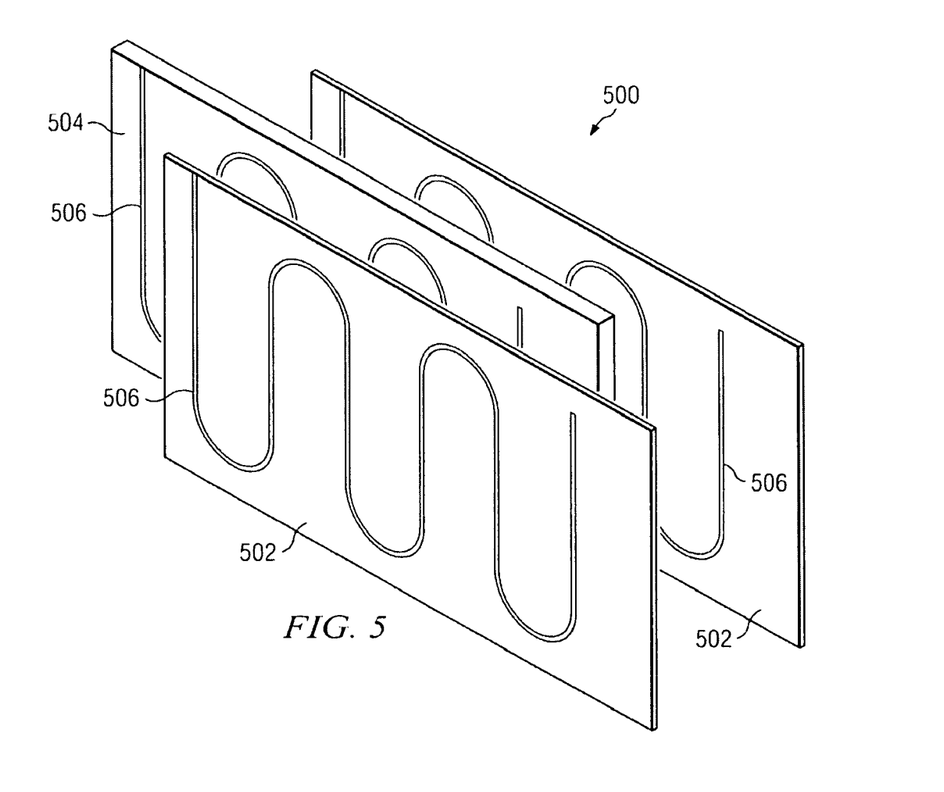
FIG. 5 is an exploded isometric view of the elements of a stacked-element detector assembly.

In another embodiment, the "thin outer-thick inner" combination can be configured as a flat plate (i.e. the cylinder is unrolled into a rectangle). FIG. 5 depicts such a flat plate detector configuration (500). In this figure, one or more "thin" primary detector layer elements (502) can be placed on either side of a "thick" secondary detector element (504). An optical insulation can also be utilized to isolate each plate. This entire "sandwiched" plate element (or multiple occurrences of it) can be immersed in the side-stream liquid being monitored. Since two "thin outer" layers are simultaneously exposed to the liquid, improved beta sensitivity is expected while preserving the gamma response characteristics of the "thick inner" core. The flat plate configuration (500) may also more easily accommodate optical readout of scintillation through the use of fiber optic elements (506) embedded in each plate.

Figure 6A:
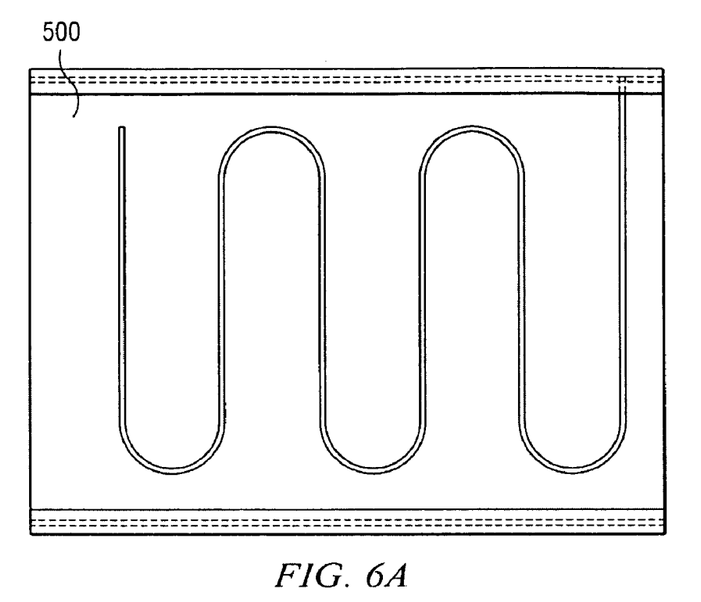
FIG. 6A is an side view of the stacked-element detector assembly.
Figure 6B:
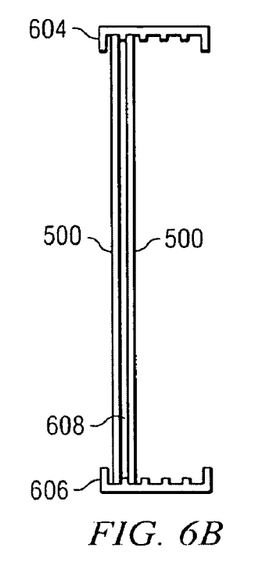
FIG. 6B is an end view of the stacked-element detector assembly.

FIG. 6 depicts a view of another flat plate embodiment. As depicted, multiple flat plate detector (500) elements may be mounted within an upper separator (604) and lower separator (606). Between the plates is a void space (608) through which the monitored fluid may flow. The distance between the plates (500) coupled with the length and height of the void space (608) determines the monitored volume. To increase detector sensitivity even more, it is possible to stack additional plates (500) within the separators (604 and 606), and/or vary the monitored volume by varying the void space or limiting the fluid flow.

In another embodiment, the detector assembly is a single thin plastic cylindrical scintillator. With sufficient outer shielding as described above, external radiation is maintained at a minimum. Because the scintillator material is thin, it is sensitive to beta emissions yet insensitive to gamma emissions. Thus, this configuration allows the detection of beta emissions within the liquid analyte without the use of the anticoincidence mode described above. Such a detector would be relatively inexpensive to produce and operate and may be sufficient if all that is important is a gross beta count with no need to differentiate Sr-90 from K-40.

Figure 7:
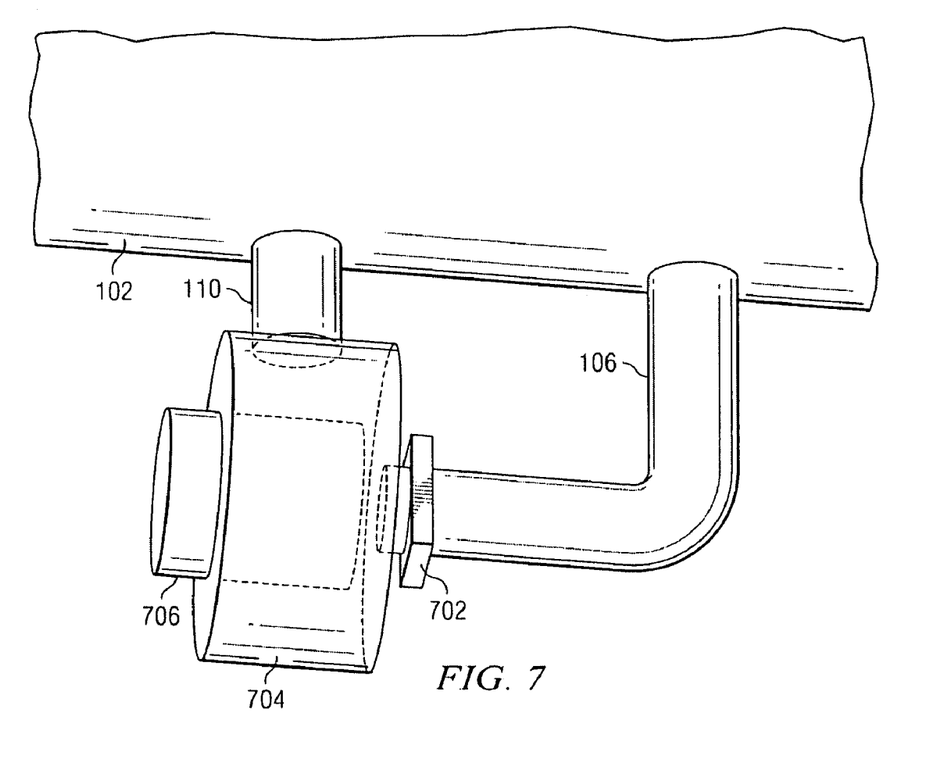
FIG. 7 is an isometric view of an additional embodiment of the detector assembly depicting use of a membrane extraction disk for absorption capture and online analysis of constituent elements.

In yet another embodiment, a membrane filter solid phase extraction disk (such as the resin coated membrane filter sold under the trademark EMPORE) is utilized in the side-stream tube. FIG. 7 depicts such a configuration. In this embodiment, a portion of the fluid flowing along the main transfer pipe (102) is directed through an intake pipe (106), through a side-stream pipe (704), and ultimately back to the main pipe through an outtake (110). The side-stream fluid must flow through a solid phase extraction disk (702). The disk (702) is positioned near the detector assembly (706) in the side-stream pipe (704) such that the detector assembly (706) may monitor the activity of radionuclides entrapped by the disk (702). This configuration works best with low-viscosity liquids (such as water or soda) having limited particulate matter. If used with liquids having high amounts of particulate (such as milk), the disk will clog and require frequent replacement. To overcome any resistance to flow of the liquid through the disk (702), a small positive-displacement pump (not shown) may be utilized in the intake (106).

The detector assembly (706) in this embodiment is a scintillation detector configuration known as a "phoswich." This type of detector comprises layers of scintillator material in the form of disks of the same diameter as the photodetector that are stacked one on top of another. The photodetection and analysis circuitry is external to the liquid stream as in the previous embodiments. In operation, the detector monitors the disk (702) in real-time for accumulation of radionuclides. If a threshold is reached, a notification is generated.

Methods of Operation

The present invention is intended to be used as a real-time to near real-time monitor for radionuclides in a flowing liquid medium. Referring again to FIG. 1, as the liquid flows through the transfer pipe (102) a portion is diverted through the side-stream tube (108). As the side-tube (108) liquid flows along the detector assembly (112 and 114 combined), it is monitored for beta and gamma activity. By operating the detector in anti-coincidence mode, activity due to K-40 and gamma emitters may be distinguished and an approximate gross beta count due to Sr-90 may be determined. If the gross beta count exceeds a threshold value, a notification is provided to alert an operator of the presence of excess Sr-90 in the analyte.

The system may also monitor the analyte for the presence of gamma activity if desired. Instead of discarding the counts caused by gamma-only emitters, the counts may be accumulated and a notification provided if a threshold is reached. This would allow the system to notify an operator of the presence of high levels of gamma-emitting and beta-emitting radionuclides in the analyte. Similarly, the level of K-40 may also be monitored.

To improve precision of measurement and to determine concentrations as well as the presence of a particular type of radionuclide using the present invention, a small pump may be used in the side-stream tube to drive the fluid through the side tube at a known and constant rate. The volume of liquid effectively interrogated by the detector can be readily established either computationally or experimentally. Under essentially constant flow conditions, a known volume V of liquid will be exposed to the scintillator detector for a known time T (the time it takes for a 'tubular volume' to move from one end of the detector to the other). The net counts recorded in this characteristic time T with determined efficiency Ec (fractional %) determines the activity A in the characteristic volume V.

Similar considerations may be applicable to the disk configuration as long as the liquid is "clear"—does not contain particulates that will quickly clog the filter. In this configuration, if a liquid containing a radionuclide at concentration C (uCi/ml) is passed through the filter at a known, set, flow rate Q(ml/min) and the filter has a known extraction efficiency XE (fractional %) then at time T (min) after inserting a fresh filter in the flow, a volume V=QT (ml) will have been sampled, and an activity A=C*Q*T*XE (uCi) will have been collected from volume V and counted with counting efficiency Ec. Extraction efficiency will doubtless change some over time and the disk will have to be changed out. Necessary background corrections may be applied to improve the measurement accuracy. In the case of milk natural K-40 was mentioned as an interfering radionuclide. In the case of the resin-loaded disk, natural Ra-226 is a known interference. Compensation for these radionuclides may be applied to improve the accuracy of the gross gamma count.

While the foregoing disclosure describes use of the present invention with liquid foodstuffs, it may be used with any liquid of interest being conveyed. For example, cooling water flowing from a power generating facility may be continuously monitored for the presence of beta or gamma emitters using any of the described embodiments. Thus, it is intended that the scope of the invention include use to assay any liquid of interest and not merely foodstuffs. Further, gases may be monitored for radionuclides by the present invention as a fluid that passes the detector assembly. The size of the detector (surface area exposed to the fluid) influences or is dependent upon the flow rate of the fluid being monitored. Thus, a high low-rate gas or a gas having a low concentration of radionuclide would require a larger detector assembly than one designed to monitor a relatively slow flow of milk.

While the foregoing disclosure describes use of the present invention with liquid flowing in a side-stream tube, the detector assembly may also be placed within the main transfer pipe stream. Use of the detector within the main stream is possible so long as the main pipe can accommodate the detector assembly and the velocity of the analyte is sufficiently slow to obtain a proper reading by the detector. Thus, the scope of the present invention includes use of a detector assembly within the main flow of the analyte.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise. (58,266).

We claim:

1. A continuous monitoring system for the detection of radionuclides in a fluid flowing through a transfer pipe, the monitoring system comprising:
    a first pipe for conveyance of a fluid;
    at least one scintillation detector assembly, the scintillation detector assembly comprising:
        a primary scintillation detector;
        a secondary scintillation detector; and
        a shielding material, wherein the shielding material optically shields the secondary detector from the primary detector, and wherein the shielding material is sandwiched between the primary and secondary detectors;
    wherein the at least one detector assembly is directly exposed to the fluid being conveyed.

2. The continuous monitoring system of claim 1, the monitoring system further comprising:
    detection circuitry that accepts input from, and differentiates between, the primary and secondary scintillation detector.

3. The continuous monitoring system of claim 1, the monitoring system further comprising:
    detection circuitry that accepts input from, and differentiates between, the primary and secondary scintillation detector, and wherein the detection circuitry allows simultaneous monitoring of coincident and anti-coincident detection events.

4. The continuous monitoring system of claim 1, the monitoring system further comprising:
    a second pipe, wherein the at least one detector assembly is located proximate the second pipe and wherein at least a portion of the main flow of liquid through the first pipe is diverted through the second pipe for monitoring by the detector assembly.

5. The continuous monitoring system of claim 1 wherein the scintillation detector assembly is cylindrical in shape, and wherein the secondary scintillation detector is surrounded by the primary scintillation detector.

6. The continuous monitoring system of claim 5 wherein the primary scintillation detector is substantially less sensitive to gamma radiation than the secondary scintillation detector.

7. The continuous monitoring system of claim 1 wherein the scintillation detector assembly comprises at least one secondary scintillation detector sandwiched between at least two primary scintillation detectors.

8. The continuous monitoring system of claim 7 wherein the primary scintillation detector is substantially less sensitive to gamma radiation than the secondary scintillation detector.

9. The continuous monitoring system of claim 1 wherein the scintillation detector assembly comprises at least two subassemblies, wherein each subassembly comprises at least two secondary scintillation detectors sandwiched between at least two primary scintillation detectors, and wherein the subassemblies are affixed such that a void space exists between each, and wherein the void space allows flow of the fluid being monitored.

10. The continuous monitoring system of claim 1, the monitoring system further comprising:
    a membrane filter solid phase extraction disc, wherein the extraction disc receives at least a portion of the fluid flow and wherein the extraction disc is mounted proximate the detector assembly, and wherein the detector assembly monitors the extraction disc.

11. A method for continuously monitoring a fluid for beta emitting radionuclides as the fluid flows through a transfer pipe, the method steps comprising:
    providing at least one scintillation detector assembly, wherein the scintillation detector assembly comprises:
        a primary scintillation detector;
        a secondary scintillation detector; and
        a shielding material, wherein the shielding material optically shields the secondary detector from the primary detector, and wherein the shielding material is sandwiched between the primary and secondary detectors; and
    providing a flow of fluid proximate the detector assembly.

12. The method of claim 11, the method steps further comprising:
    diverting at least a portion of the fluid through a side-stream pipe, wherein the side-stream fluid flow is proximate the detector assembly.

13. The method of claim 11, the method steps further comprising:
    simultaneously monitoring both the primary and secondary scintillation detectors for coincident and anti-coincident events.

14. The method of claim 11 or claim 12, the method steps further comprising:
    detecting pure gamma events, wherein a pure gamma event is an anti-coincident event detected in both the primary and secondary scintillation detectors simultaneously; and
    detecting pure beta events, wherein a pure beta event is an event detected in only the primary scintillation detector.

15. The method of claim 14, the method steps further comprising:
    detecting coincident beta-gamma events; and
    subtracting the beta-gamma event count from the overall beta count to determine a gross beta-only event count.

16. The method of claim 14, the method steps further comprising:
  detecting coincident beta-gamma events; and
  differentiating between pure beta emitting radionuclides and beta-gamma emitting radionuclides.

17. A method for continuously monitoring a fluid for beta emitting radionuclides as the fluid flows through a transfer pipe, the method steps comprising:
  providing at least one scintillation detector assembly, wherein the detector assembly comprises a primary and a secondary scintillation detector with a shielding material sandwiched therebetween, the shielding material optically shielding the secondary detector from the primary detector;
  operating the primary and secondary scintillation detectors in both coincident and anti-coincident mode; and
  differentiating between pure beta emitting radionuclides and beta-gamma emitting radionuclides based upon detected events.

* * * * *

UNITED STATES PATENT AND TRADEMARK OFFICE
CERTIFICATE OF CORRECTION

PATENT NO. : 8,039,810 B2
APPLICATION NO. : 12/408512
DATED : October 18, 2011
INVENTOR(S) : John C. Rodgers and Markku J. Koskelo Page 1 of 1

It is certified that error appears in the above-identified patent and that said Letters Patent is hereby corrected as shown below:

On the Title Page:
Item (57) in the Abstract:
Column 2, line 6 of the Abstract paragraph, please delete ")" immediately following the word "having."

In the Specification:
In column 3, line 6, please delete "thicket" and insert --thicker--.

In column 4, line 22, please delete "forces" and insert --force--.

In column 6, line 54, please delete "based oil one or more or these" and insert --based on one or more of these--.

In column 9, line 3, please delete "low-rate" and insert --flow-rate--.

Signed and Sealed this
Thirteenth Day of March, 2012

David J. Kappos
*Director of the United States Patent and Trademark Office*